United States Patent [19]
Richardson

[11] Patent Number: 5,483,644
[45] Date of Patent: Jan. 9, 1996

[54] METHOD FOR INCREASING CACHEABLE ADDRESS SPACE IN A SECOND LEVEL CACHE

[75] Inventor: Nicholas J. Richardson, Tempe, Ariz.

[73] Assignee: VLSI Technology, Inc., San Jose, Calif.

[21] Appl. No.: 48,710

[22] Filed: Apr. 15, 1993

[51] Int. Cl.$^6$ .............................. G06F 12/00; G06F 13/00
[52] U.S. Cl. ..................... 395/403; 364/DIG. 1
[58] Field of Search .......................... 395/400, 425

[56] References Cited

U.S. PATENT DOCUMENTS

| | | | |
|---|---|---|---|
| 4,395,754 | 7/1983 | Feissel | 395/400 |
| 4,763,250 | 8/1988 | Keshlear et al. | 395/400 |
| 4,947,319 | 8/1990 | Bozman | 395/425 X |
| 5,132,927 | 7/1992 | Lenoski et al. | 365/49 |
| 5,133,058 | 7/1992 | Jensen | 395/400 |
| 5,222,222 | 6/1993 | Mehring et al. | 395/400 |
| 5,276,832 | 1/1994 | Holman, Jr. | 395/425 |
| 5,287,481 | 2/1994 | Lin | 395/425 |
| 5,337,477 | 4/1994 | Taylor et al. | 395/425 |

*Primary Examiner*—Michael A. Whitfield
*Attorney, Agent, or Firm*—Harry M. Weiss

[57] ABSTRACT

A Tag Field for a second level cache memory subsystem in a PC is provided which replaces the fixed Valid and Dirty bits with programmable bits which can each be programmed as a Valid bit, a Dirty bit, or an additional address bit. The cacheable address space of the PC can thus be increased by programming one or more of the two programmable bits as additional address bits. This method can be implemented on existing computers by modifying the system or application software to utilize these programmable bits in a manner to achieve more optimum performance of the cache.

3 Claims, 1 Drawing Sheet

5,483,644

METHOD FOR INCREASING CACHEABLE ADDRESS SPACE IN A SECOND LEVEL CACHE

BACKGROUND OF THE INVENTION

1. Field of the Invention

This invention generally relates to cache memories in computer systems and, more specifically, relates to a method for increasing the address space of memory locations which can be stored in a second level cache.

2. Description of the Related Art

A low cost second level cache subsystem is often included in personal computer systems to improve the effective speed of memory accesses. The memory devices associated with second level caches normally comprise multiple Static Random Access Memories (SRAMs) to hold data, and one or more SRAMs to hold control fields knows as Tag Fields. There is one Tag Field associated with each data entry or line in the cache. Each Tag Field comprises an address field which holds address bits that are used to associate a cache line with a particular main memory location, and a control field with two status bits that indicate whether the associated line holds valid data (Valid bit) and, in a writeback cache, whether that line has been modified in cache, but not in main memory (Dirty bit).

To allow a second level cache to hold data from any addressable memory location, the width of the tag address field must be sufficient to hold the number of address bits corresponding to the number of bits above the address space addressable directly by the cache. For instance, for a typical 128 Kbyte direct map cache used in a system that employs 32 bit addresses, A[0] through A[16] (17 bits) address the 128 Kbyte in the cache, and the tag address field must hold the values of A[17] through A[31] (15 bits). However, in Personal Computer (PC) systems, in order to reduce both cost and pin count, the width of the Tag Field including both address and control bits is often limited to that of a single 8 or 9 bit SRAM. The effect of limiting the number of tag address bits is to reduce the memory address range over which the cache is operative. For instance, if the same 128 Kbyte direct map cache above uses an eight bit SRAM for the Tag Field that holds six tag address bits and the Valid and Dirty status bits, then the tag address field must hold the values of A[17] through to A[22]. For a cache bit to be detected, the cache controller must assume that A[23] to A[31] have some fixed value (normally zero) and the cacheable memory address range is limited to the eight Mbytes represented by the address range from A[0] to A[22].

The system and application software for PCs typically assigns a fixed format for the Tag Field comprising a Valid bit, a Dirty bit, and address bits. This fixed format does not allow the PC to benefit from performance increases that could be achieved if the format of the Tag Field were programmable, increasing the addressable range of the cache in certain circumstances.

Therefore, there existed a need to provide a method of dynamically changing the Tag Field in a second level cache by the system software or by application software to use the status bits as additional address bits to increase the address space accessible to the cache (cacheable address space). This software will have the flexibility of configuring the Tag Field to make tradeoffs concerning cacheable address space, functionality, and performance of the cache.

SUMMARY OF THE INVENTION

It is an object of this invention to provide a method for increasing the cacheable address space of a typical PC by allowing the system or application software to use the Valid and Dirty status bits as additional cache address bits.

According to the method of the present invention, the two bit positions in the Tag Field that are nominally assigned to the Valid and Dirty bits in prior art systems are instead used as programmable bits. Each of these two bits can be programmed as a Dirty bit, a Valid bit, or additional cache address bits. If both of these programmable bits are used as additional address bits, the cacheable address space will be expanded to four times its nominal range when compared to the prior art systems. The increase in cacheable address space comes at the expense of functionality if the Valid bit is used as an address bit, and at the expense of performance if the Dirty bit is used as an address bit.

In typical second-level cache implementations for PCs, a Valid bit is usually not required. Once the cache is initialized after system reset, the hardware can ensure that each cache location is always mapped to a valid main memory location. The functionality lost by replacing the Valid bit with an additional address bit is the lost capability of invalidating cache lines by simply clearing the Valid bit. This feature can be useful under certain circumstances, depending on the particular software application being executed.

If the Dirty bit is replaced by an additional cache address bit, then each line in the cache must be assumed to be Dirty, and thus each line must be written back to main memory when replaced with a line from a different memory address. An extra penalty is thus incurred on cache misses since the cache must not only retrieve the new line of data, but before doing so it must always write back the line of data that is to be replaced by the new line, instead of writing it back only when the line has been modified. For large second-level caches, the miss rate for many applications is often quite low and hence the benefit of increasing the cacheable address range can outweigh the penalty of increasing overhead during cache misses.

The method of the present invention allows selection of the function of the programmable Tag Field bits to be made by the software or firmware via a programmable register. The optional Tag Field configuration can therefore be determined by firmware during system initialization, or can be changed dynamically by the operation system software on an application by application basis.

The foregoing and other objects, features and advantages will be apparent from the following description of the preferred embodiment of the invention as illustrated in the accompanying drawings.

DESCRIPTION OF THE PREFERRED EMBODIMENT

Figure 1:
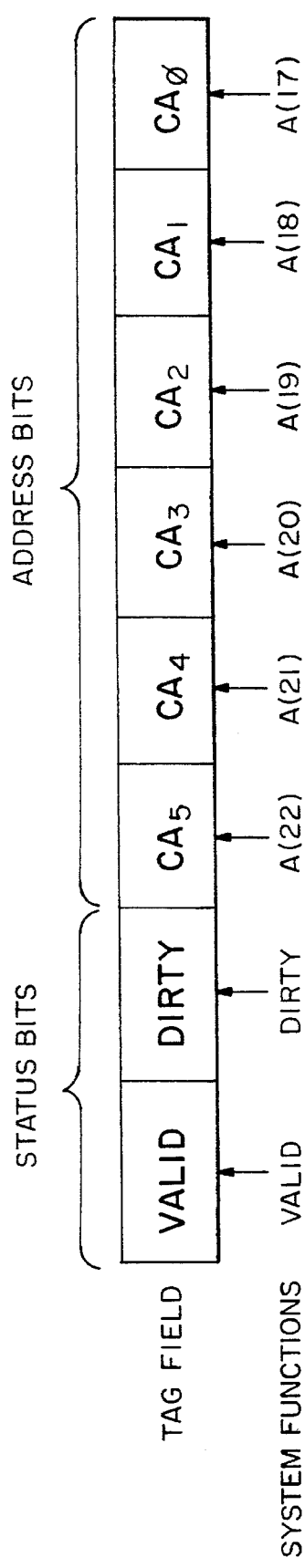
FIG. 1 is a view of the Tag Field configuration used in a typical second level cache system of the prior art.

FIG. 1 shows the configuration of a prior art Tag Field used in a typical cache system in a computer such as a Personal Computer (PC). The size of the cache system is assumed to be 128 Kbytes for illustrative purposes, which requires A[16] through A[0] of the system address lines to address this 128 Kbytes of cache. The size of the Tag Field is assumed to be eight bits wide. As shown in FIG. 1, the prior art Tag Field has a fixed assignment of bits, with being six Cache Address Bits CA[5] to CA[0], and the remaining two bits being Status Bits (Valid and Dirty). The six address bits CA[5] to CA[0] correspond to system address bits A[22]

to A[17] as shown. In a 32-bit PC, the cacheable address range of the prior art is thus $2^{23}$ or 8 Mbytes.

Figure 2:
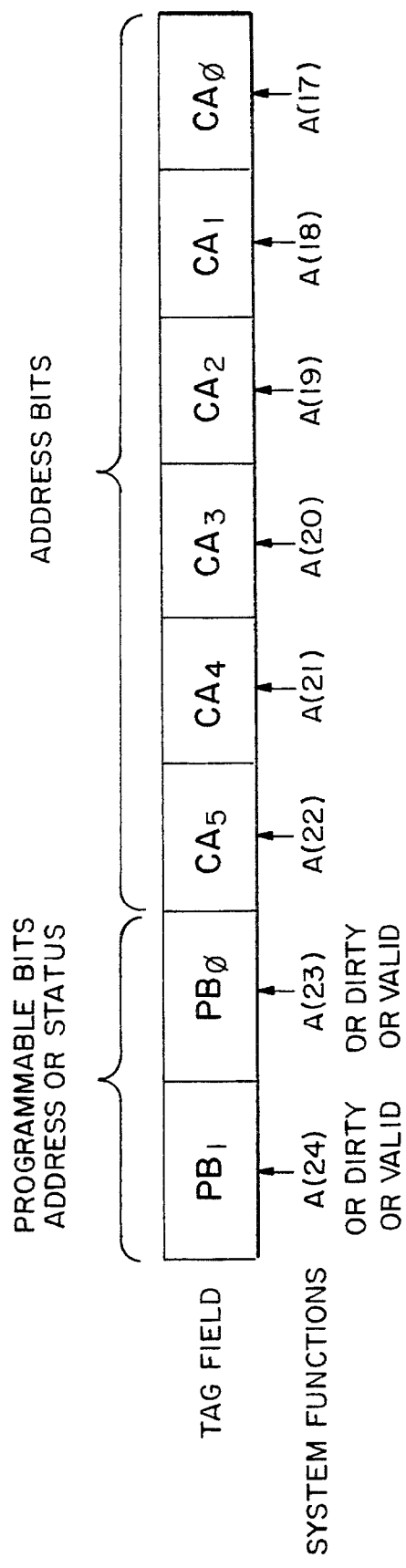
FIG. 2 is a view of the Tag Field configuration used in a second level cache system of the present invention.

The configuration of the Tag Field of the present invention is shown in FIG. 2. The lower six bits of address CA[5] to CA[0] are the same as for the Tag Field of the prior art, and have the same corresponding system address bits A[22] to A[17] as shown. The difference is that the two upper bits are not fixed Valid and Dirty bits, but are rather programmable bits PB0 and PB1. Each of these PB0 and PB1 bits can be programmed to be a Dirty Bit, a Valid Bit, or an additional address bit. In this manner the system or application software can choose to forego the benefit of using one or both status bits if the increase in cacheable address space that results is more significant than the performance lost by eliminating the one or more status bits. If PB0 and PB1 are programmed as address bits A[23] and A[24] as shown, the cacheable address space increases from $2^{23}$ (8 Mbytes) to $2^{25}$ (32 Mbytes).

By replacing the fixed Valid and Dirty bits of the prior art with programmable bits PB1 and PB0, the system or application software can configure the Tag Field of the present invention to optimize performance, depending on the system and performance parameters to be optimized. These programmable bits PB1 and PB0 give the computer system that uses the method of the present invention great flexibility in adapting to different operating conditions, without the addition of hardware. This method can be used on existing computers by simply changing the system and/or application software to take advantage of these programmable bits PB1 and PB0.

While the invention has been described in its preferred embodiment, it is to be understood that the words which have been used are words of description rather than limitation, and that changes may be made within the purview of the appended claims without departing from the true scope and spirit of the invention in its broader aspects.

What is claimed is:

1. A method for increasing the address range of a cache system having a cache memory comprised of a plurality of cache entries, said method comprising the steps of:

providing a plurality of cache tag field memory locations corresponding to each cache entry, each cache tag field memory location having a plurality of bits comprising address bits and at least one programmable bit;

storing a portion of address data in said address bits; and programming said programmable bit with another portion of said address data to provide an additional address bit.

2. A method for increasing the address range of a cache system having a cache memory comprised of a plurality of cache entries, said method comprising the steps of:

providing a plurality of cache tag field memory locations corresponding to each cache entry, each cache tag field memory location having a plurality of bits comprising address bits and status bits;

replacing said status bits with programmable bits;

storing a portion of address data in said address bits; and programming at least one of said programmable bits with another portion of said address data to provide an additional address bit.

3. The method of claim 2 wherein said step of programming at least one of said programmable bits comprises the step of programming all of said programmable bits with another portion of said address data to provide additional address bits.

* * * * *